Sept. 17, 1968 W. KRIEBEL ET AL 3,401,945

SOUND-REPRODUCING APPARATUS

Filed June 28, 1966 4 Sheets-Sheet 1

Sept. 17, 1968 W. KRIEBEL ET AL 3,401,945

SOUND-REPRODUCING APPARATUS

Filed June 28, 1966 4 Sheets-Sheet 4

United States Patent Office 3,401,945
Patented Sept. 17, 1968

3,401,945

SOUND-REPRODUCING APPARATUS

Walter Kriebel, Kiel, Karl-Heinz Tiedtke, Kiel-Elmschenhagen, and Walter Eggers, Kiel, Germany, assignors to Electroacustic Gesellschaft mit beschrankter Haftung, Kiel, Germany, a corporation of Germany Filed June 28, 1966, Ser. No. 561,120
Claims priority, application Germany, June 29, 1965, E 29,599
22 Claims. (Cl. 274—11)

Our invention relates to sound-reproducing apparatus.

In particular, our invention relates to that type of sound-reproducing apparatus in which the signals are recorded on a magnetic tape or other sheet material with the signals being arranged along the arcs of a plurality of concentric circles. In this type of apparatus the sheet material on which the signals are recorded is advanced in a stepwise manner radially with respect to the arcs along which the signals are recorded so as to bring the several arcuate lines of recorded signals to a predetermined location in succession. A tone arm swings back and forth about an axis passing through the center of the concentric circles along which the recorded signals are situated, and during the stepwise movement of the signal-carrier a pick-up head of the tone arm will be capable of cooperating with the successive lines of signals to reproduce the sound recorded thereby.

This general type of apparatus is already known, as shown, for example, in German Patent 1,157,806 where there is disclosed a tone arm which swings back and forth about a predetermined axis. With this known construction the tone arm is swung back and forth about its axis by way of a rotary drive member carried directly by the tone arm, in the region of its pick-up head, and cooperating with a shiftable transmission element supported for shifting movement in the region of the tone arm. The rotary drive member which is carried directly by the tone arm is driven by an electric motor which is laterally fixed to the tone arm so that the axis of the motor extends parallel to the longitudinal axis of the tone arm. As a result, with this construction the motor swings back and forth together with the tone arm.

The known structure, as exemplified above, has several disadvantages. Thus, the speed of swinging movement of the tone arm in one direction is different from its speed of swinging movement in the opposite direction due to the structure of the transmission means employed. As a result, during the recording of signals on the magnetic signal-carrying sheet, the recorded signals produced during swinging of the arm at its slower speed will provide recorded signals which are crowded together to an extent greater than those recorded during swinging of the arm in the other direction at the higher speed. As a result there are unavoidable recording distortions, particularly resulting from the fact that the speed of swinging movement of the tone arm is in any event maintained at a relatively low value because of the relatively small extent of the magnetic area available for recording signals and the relatively small width of the arcuate lines along which the signals are recorded.

A further serious disadvantage of the known structures resides in the fact that the drive for the tone arm takes place, for example, by way of a worm drive extending from the motor directly carried by the tone arm to the rotary drive member which is also directly carried by the tone arm. This driving structure directly carried by the tone arm adds to the mass of said arm and therefore unavoidably results, during the recording of sound signals, in undesirable distortions which are further distorted during playback of the signals, so that the quality of the sound provided by the apparatus necessarily suffers.

It is a primary object of our invention to provide a sound-reproducing apparatus of the above general type which will avoid the above drawbacks.

More specifically, it is an object of our invention to provide a sound-reproducing apparatus in which the drive for the tone arm is taken from an electric motor which has a fixed location separate from the swingable tone arm.

Furthermore, it is an object of our invention to provide an apparatus of this type in which the electric motor is required to turn only in one direction at all times.

Also, it is an object of our invention to provide an apparatus of the above type which is capable of swinging the tone arm back and forth at the same angular speed in both directions.

Also, the objects of our invention include an apparatus in which there is very little frictional resistance to movement of the parts during changing of the transmission between its positions in which the tone arm is respectively swung in its opposite directions.

Thus, according to our invention a tone arm is supported by a support means for swinging movement back and forth through a predetermined angle about a predetermined axis, and a driving motor is carried by the support means at a fixed, predetermined location spaced from the tone arm. A transmission means of our invention is driven by the driving motor and is operatively connected with the tone arm for swinging the latter back and forth through this predetermined angle, and the transmission means has a pair of positions in which the tone arm is respectively swung in its opposite directions, this transmission means of our invention providing the same speed of turning movement for the tone arm in both of its directions of swinging movement. A displacing means of our invention is operatively connected with the transmission means for displacing the latter between its positions at the ends of the swinging movement of the tone arm through the above-mentioned predetermined angle.

Our invention is illustrated by way of example in the accompanying drawings which form part of our application and in which.

Figure 3:
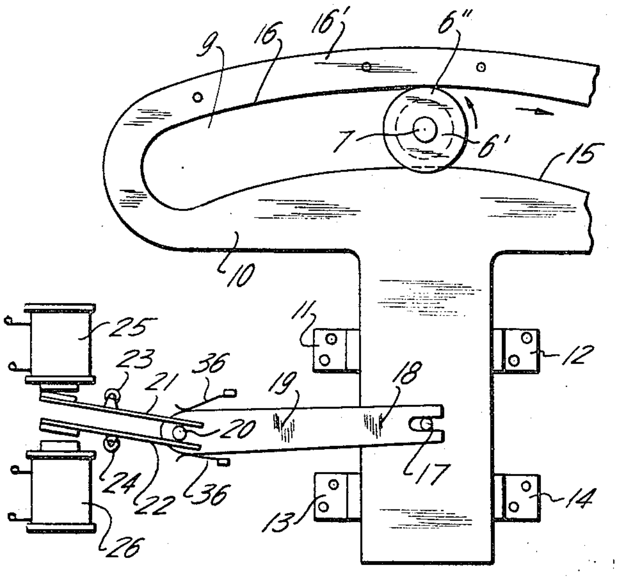
FIGS. 3 and 4 are respectively schematic fragmentary plan and sectional views of details of the structure of FIGS. 1 and 2.

Referring now to FIGS. 1–4 in which one possible embodiment of a structure according to our invention is illustrated, a swingable tone arm 1 (FIGS. 1 and 2) carries at a free end a pick-up head 2 and is supported for swinging movement by a support means which includes a flat support plate forming a wall of a housing of the apparatus. The support means includes in addition to the support plate 3 a pivot pin 4 which is fixed to and extends perpendicularly from the support plate 3, this pin 4 extending through the tone arm 1 at its end distant from the pick-up head 2, and the tone arm 1 is swingable in both directions about the pin 4 of the support means, the axis of the pin 4 determining the turning axis of the tone arm 1. The pick-up head 2 has a pair of semi-circular transducers of known construction capable of participating in the conversion between magnetic recorded signals and audible sound signals, and these transducers are situated at a relatively small distance from each other for cooperation with the signals which are recorded on a sheet-material signal carrier formed, for example, by the tape 5 on which the signals are recorded in a magnetic layer of material carried by the tape 5, as is well known. The distance between the transducers of the pick-up head 2 corresponds to the distance between the successive arcuate lines of signal recordings carried by the sheet-material carrier 5, and the latter is advanced in a stepwise manner from one line of recorded signals to the next during each reversal in the direction of swinging movement of the tone arm.

The tone arm 1 is swung back and forth through a predetermined angle about the axis of the pin 4 by a transmission means of our invention, and this transmission means includes a rotary transmission unit 6 having a pair of circular motion-transmitting members 6′ and 6″ which are coaxially fixed to each other for rotation together, so that the rotary transmission unit 6 has a stepped construction. This unit 6 is fixedly carried by a shaft 7 coaxial with the unit 6 and extending through and turnably carried directly by the tone arm 1. At its end distant from the rotary transmission unit 6, the shaft 7 fixedly carries a grooved cable pulley 8 which forms part of a belt-and-pulley drive of the transmission means of our invention.

Figure 4:
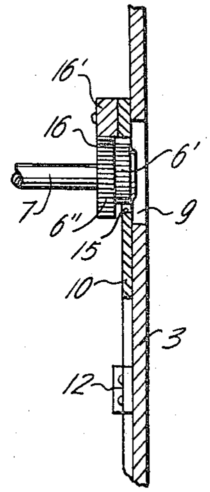
Figure 1:
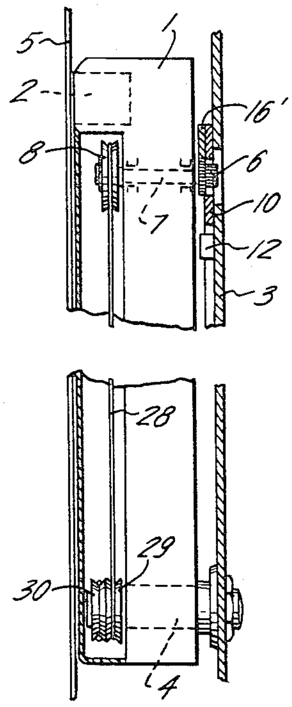
FIG. 1 is a fragmentary schematic sectional side view of one possible embodiment of a sound-reproducing apparatus according to our invention.
Figure 2:
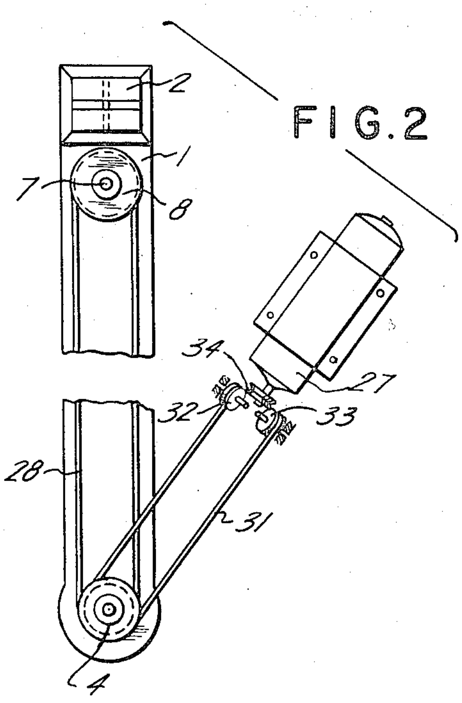
FIG. 2 is a schematic fragmentary plan view of the structure of FIG. 1.

As is shown most clearly in FIGS. 3 and 4, the turning axis of the unit 6 extends through an elongated gap 9 which extends along a circle whose center is in the turning axis of the tone arm 1. This gap 9 is formed in a second transmission unit of our invention, and this second unit includes the motion-transmitting portions 15 and 16 which are adapted to cooperate frictionally with the members 6′ and 6″, respectively. The concentric arcuate motion-transmitting portions 15 and 16 extend along opposed edges of the gap 9 which is formed in a shiftable control plate 10. With the transmission of our invention, the motion-transmitting member 6″ of larger diameter coacts with the motion-transmitting portion 16 of larger diameter, while the motion-transmitting member 6′ of smaller diameter cooperates with the motion-transmitting portion 15 of smaller diameter. As is shown most clearly in FIG. 4, the motion-transmitting portions 15 and 16 of the control plate 10 are situated at different elevations with respect to the support plate 3 while being parallel thereto. The plate 10 is thickened at its portion which is provided with the motion-transmitting portion 16, as by having an additional layer 16′ fixed to the remainder of the control plate 10, so that in this way the motion-transmitting portion 16 may be considered as an upper motion-transmitting portion, while the motion-transmitting portion 15 is closer to the plate 3 and may be considered as a lower motion-transmitting portion.

The support means of our invention supports the control plate 10 for shifting movement radially with respect to the turning axis of the tone arm 1 by way of a guide means which includes a plurality of angle members 11–14 fixed to the plate 3 and having legs extending therefrom and slidably engaging opposed side edges of an elongated portion of the control plate 10 which extends toward the pin 4.

A displacing means of our invention coacts with the control plate 10 for radially shifting the latter between the positions which will provide the different directions of swinging movement for the tone arm, and this displacing means includes a swingable lever 18 formed at one end with a notch receiving a pin 17 fixed to the plate 10, this lever 18 being supported intermediate its ends for turning movement about a pin 19 carried by the plate 3 and extending parallel to the pin 4. Thus, during swinging of the lever 18 in opposite directions the plate 10 will be radially shifted in opposite directions.

In one direction of shifting movement of the plate 10 the upper motion-transmitting portion 16 thereof is brought into engagement with the rotary transmission member 6″, while in the other direction of shifting movement the lower motion-transmitting portion 15 is brought into engagement with the motion-transmitting member 6′. The rotary unit 6 cooperates frictionally with the unit 10 of the transmission means of our invention, so that the transmission is provided simply by the pressure with which the members 6′ and 6″ respectively engage the portions 16 and 15.

The displacing means includes a pair of electromagnets 25 and 26 which are alternately energized at the ends, respectively, of the swinging movement of the arm 1, in a known manner which is not illustrated in FIGS. 1–4, and these electromagnets 25 and 26 respectively cooperate with a pair of armatures 21 and 22 respectively supported for turning movement about pins 23 and 24 and coupled to each other for swinging movement together. Between the armatures 21 and 22 is situated a pin 20 which is fixed to the shifting lever 18 at its end distant from the pin 17. The centering leaf springs 36 engage the lever 18 to automatically situate the latter at an intermediate position in which both armatures are spaced from the electromagnets when the latter are both simultaneously unenergized, and in this intermediate position of the lever 18 the control plate 10 is placed in a position where neither one of the motion-transmitting portions 15 and 16 are in engagement with the rotary unit 6.

As was mentioned above, with the transmission means of our invention the tone arm is swung in both directions at the same angular speed. This result is achieved by providing between the diameter of the rotary member 6′ and the diameter of the motion-transmitting portion 15 a ratio which is equal to the ratio between the diameter of the rotary motion transmitting member 6″ and the motion-transmitting portion 16.

The drive for the tone arm is taken not from a motor which is carried directly by the tone arm but instead from a driving motor 27 in the form of an electric motor which rotates at all times in only one direction and which is carried by the support plate 3 at a fixed predetermined location spaced from the tone arm 1. The transmission means for transmitting the drive from the motor 27 to the tone arm 1 includes not only the above-described transmission units 6 and 10 but also a belt-and-pulley drive. This belt-and-pulley drive includes a grooved pulley 8 fixed to the shaft 7, as pointed out above, and a pair of coaxial pulleys 29 and 30 fixed to each other for rotation together and supported for rotary movement by the pin 4, so that the turning axis of the pulley unit 29, 30 is coaxial with the turning axis of the tone arm 1. An endless belt in the form of a cable 28 made of a substantially non-stretchable material extends around the grooved pulleys 8 and 29. This endless cable 28 can be made of a plastic such as, for example, Perlon or nylon. Of course, instead of supporting the pulley unit 29, 30 directly on the pivot pin 4, this pulley unit can also be supported on a separate pin coaxial with thhe pivot pin 4 and carried by a separate bracket which is fixed to the support plate 3. In this case the pin which supports the unit 29, 30 will be coaxial with but spaced slightly from the pin 4.

The belt-and-pulley drive includes a second endless cable 31 made, for example, of the same substantially unstretchable plastic material as the cable 28 and extending around the other grooved pulley 30 of the unit 29, 30. This second endless cable 31 is guided by the grooved rotary guide pulleys 32 and 33, suitably mounted on the plate 3, around a grooved pulley 34 which is fixed directly to the drive shaft of the motor 27 to be driven thereby. Thus, during rotation of the motor 27 the drive will be transmitted by the cable 31 to the rotary unit 29, 30 which will then transmit the drive by the cable 28 to the pulley 8 for rotating the transmission unit 6.

Figure 2A:
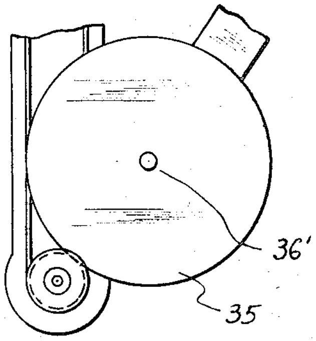
FIG. 2*a* shows a modified portion of the same structure.

Instead of using elements 31–33, these elements can be replaced by a rotary friction disc 35, shown in FIG. 2*a*, and supported for rotary movement about a fixed pin 36'. This friction disc 35 can be frictionally driven by a rotary friction member which replaces the pulley 34 and can have its periphery frictionally pressing against a rotary friction member replacing the pulley 30, so that in this way not only is a friction drive provided but in addition it is possible to step the transmission ratio down in the course of the transmission of the drive from the motor 27 to the pulley 29. Of course, a series of such step-down transmission units can be connected in series in the event that a relatively large step-down in the transmission ratio from the motor to the pulley 8 is desired.

Figure 5:
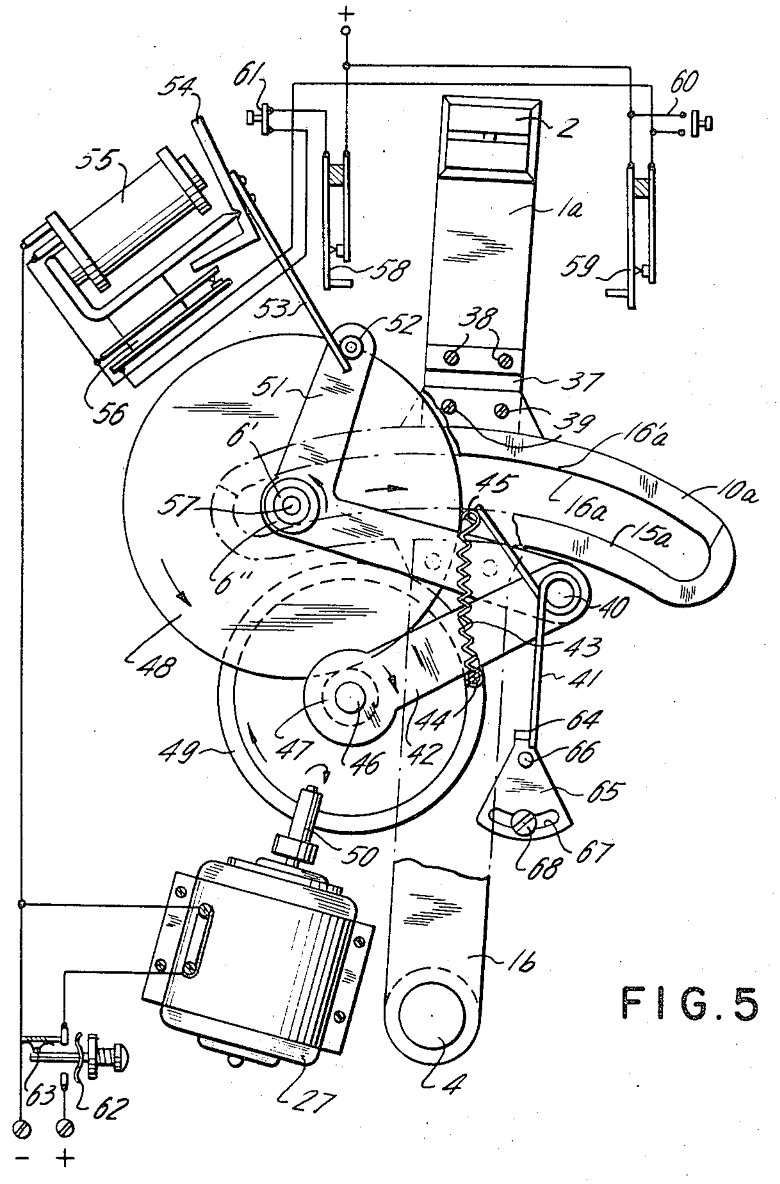
FIG. 5 is a schematic plan view of another embodiment of a sound-reproducing apparatus according to our invention.
Figure 6:
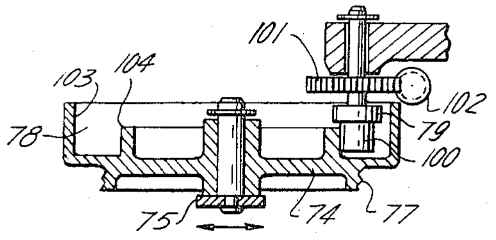
FIG. 6 is a fragmentary sectional elevation of part of the transmission means of a third embodiment of an apparatus according to our invention.

In the embodiment of our invention which is illustrated in FIG. 5, the transmission unit 10 is replaced by a transmission unit **10*a* in the form of plate which is fixed directly to the tone arm for swinging movement therewith. In this embodiment the tone arm has a pair of portions 1*a* and 1*b*, and the control plate 10*a* is fixed between these portions by way of suitable screws 39. The portion 1*a* of the tone arm terminates in the pick-up head 2, and this portion is fixed to the control plate 10*a* by way of a leaf spring 37 fixed by the screws 39 to the control plate 10*a* and by the screws 38 to the portion 1*a* of the tone arm. The transmission unit 10*a* is parallel to the support plate 3 and of course it is formed between the motion-transmitting portions 15*a* and 16*a* with an arcuate gap extending along a circle whose center is in the turning axis of the tone arm, this turning axis being determined by the pivot pin 4 which is carried by the plate 3** in the manner described above.

With the embodiment of FIG. 5 the rotary transmission unit 6 also has a stepped construction and includes the rotary transmission member 6' and 6'' whose common axis extends through the gap defined between the motion-transmitting portions **15*a* and 16*a* of the control plate 10. With the embodiment of FIG. 5 it is the rotary unit 6 which is supported by the support means for shifting movement to determine the different positions of the transmission means while the unit 10*a*** is fixed to the tone arm for swinging movement therewith.

According to the embodiment of FIG. 5, the shifting of the unit 6 is achieved not by way of a pair of electromagnets, as shown, in FIG. 3, but, instead from a single electromagnet 55 which forms part of a knife-edge type of relay. With this displacing means the unit 6 will be displaced into engagement either with the upper motion-transmitting portion **16*a* or the lower motion-transmitting portion 15*a* of the control plate 10** to cooperate frictionally therewith.

The driving motor 27 of FIG. 5 is energized upon closing of a switch 62 and turns in the direction indicated by the arrow in FIG. 5. The rotary drive shaft of the driving motor is directly fixed with a rotary friction wheel 50 which frictionally cooperates with an outer peripheral portion of a stepped friction wheel 49 having an inner concentric stepped friction transmission portion 47 which turns together with the wheel 49. This stepped friction portion 47 of smaller diameter, of the wheel 49, frictionally bears against the periphery of a friction disc 48. This rotary friction disc 48 is coaxially fixed to the rotary transmission unit 6. This unit 6 rotates in a counterclockwise direction, as indicated by the arrow in FIG. 5. In its different positions it will cooperate with the control plate **10*a* for swinging the arm 1*a*, 1*b* back and forth in different directions through the same predetermined angle. When the unit 6 is in the position illustrated in FIG. 5, the motion-transmitting member 6' frictionally engages the motion-transmitting portion 15*a*** for turning the tone arm in a clockwise direction, as indicated by the arrow in FIG. 5.

The stepped friction wheel 47, 49 is turnably carried by a pin 46 and the rotary transmission units 6 together with the friction disc 48 are supported for coaxial rotary movement by a pin 57 to which the units 6 and 48 are fixed so they will rotate together. The pin 46 is fixed in the region of one end of an elongated lever 42 which is swingable about a stationary pivot pin 40 carried by the support plate 3, and the rotary pin 57 is turnably carried by a bell crank substantially at the junction between the arms thereof, this bell crank 51 forming a lever having a free end also pivotally supported by the pivot pin 40. A spring 43 is stretched between the levers 51 and 42 so as to urge them to swing toward each other about the common axis of the pin 40, and for this purpose the ends of the spring 43 are hooked onto lugs 44 and 45 which are respectively fixed to and project from the levers 42 and 51. Thus, the spring 43 serves to maintain the friction disc 48 in frictional engagement with the stepped portion 47 of the stepped friction wheel 47, 49.

The lug 45 is also engaged by a free end of a spring 41 which is coiled once about the pin 40 and has an opposite free end engaging an angularly projecting portion 64 of an adjusting plate 65 supported for turning movement about a stationary pivot 66 carried by the plate 3 and capable of being fixed in an adjusted angular position by a screw 68 which extends through a slot 67 formed in the adjusting plate 65. Thus, by adjusting the angular position of the plate 65 it is possible to adjust the force with which the spring 41 urges the lever 51 to turn about the pin 40, and in this way the frictional engagement between the motion-transmitting member 6' and the motion-transmitting portion **15*a* can be regulated. Thus, the plate 65 by its cooperation with the spring 41** forms an adjusting means therefor.

At its end distant from the pin 40, the lever 51 supports for free rotary movement a roller 52 engaged by a lever arm 53 of an armature 54 supported for swinging movement by a knife-edge structure, as shown schematically in FIG. 5, this armature 54 coacting with the coil 55 of the illustrated relay. The armature 54 also controls the operating contacts 56 of the relay 55.

During the swinging of the tone arm in a clockwise direction, as viewed in FIG. 5, it will, after turning through a predetermined angle, engage and close the switch 59 resulting in energizing of the relay 55 by providing an impulse of current therethrough, and this is a holding relay which will then hold itself energized by way of the closed switch 58 and the relay switch 56. The energizing of the relay swings the armature 54 so as to displace the lever 53 and thus turn the lever 51 in a clockwise direction about the pivot 40, so that in this way the unit 6 is swung away from the position shown in FIG. 5 to a position where the larger diameter motion-transmitting member 6'' of the unit 6 engages the larger diameter motion-transmitting portion **16*a* of the transmission unit 10*a*. As a result the tone arm will now swing in the opposite direction and at the same speed as in the former direction, by reason of the transmission ratios which are equal for both directions, as described above. This swinging movement of the tone arm back toward the switch 58 continues until the latter is opened by the tone arm, with the result that the self-holding circuit of the relay 55 is opened, the relay 55 becomes unenergized, and the armature 54 returns to the position shown in FIG. 5 as a result of the automatic return of the parts to the illustrated position by the spring 41. Thus, with this embodiment the displacing means includes the spring 41 which maintains the transmission in one of its positions while the relay 55 forms another part of the displacing means which shifts the transmission means to the other of its operating positions in opposition to the spring 41. As soon as the relay 55 becomes unenergized, therefore, the spring 41 returns the parts to the illustrated position where the motion-transmitting member 6' frictionally engages the motion-transmitting portion 15***a* to again swing the arm in a clockwise direction.

It is possible to change the direction of swinging movement of the tone arm, with the embodiment of FIG. 5, by hand operation at any position of the tone arm. For this purpose the operator need only actuate the switches 60 and 61, closing the switch 60 and opening the switch 61. At the same time it is desirable to terminate the stepwise advance of the tape. Such an interruption in the operations is provided for the purpose of erasing part of a recorded line and replacing it with other signals.

In order to prevent continued operation of the motor 27 after the device is turned off, the shut-off switch 62 is combined with a short-circuit contact 63 for the motor terminals in such a way that before closing the switch 62 the short-circuit of the contact bridge 63 is interrupted. When the switch 62 is turned off, the motor terminals are short-circuited after raising away of the contact bridge of the contacts 62 and the motor is thus instantly stopped.

A third embodiment of our invention is illustrated in FIGS. 6–9 of the drawings.

This embodiment is extremely simple. The turning speed of the tone arm is the same in both directions. The driving motor is carried at a fixed location by the support means, and the tone arm is swung back and forth by way of a pulley-and-cable drive. The pair of concentric frictional motion-transmitting portions of one of the transmitting units is coaxially fixed with one of the grooved pulleys for the cable drive. This embodiment of our invention is described in detail below.

The tone arm 70 is supported for swinging movement about the axis determined by the pivot pin 69 carried by the support plate 3 and forming therewith part of the support means. The tone arm 70 is swung back and forth through the medium of a cable 71 made, for example, of Perlon or nylon. This cable 71 is guided around a pair of grooved pulleys 72 and 73 which are situated in a plane parallel to the turning axis of the tone arm with the turning axes of the pulleys 72 and 73 extending perpendicularly through this plane and being perpendicular to the turning axis of the tone arm 70. The pulleys 72 and 73 turn so as to move the cable 71 and thus displace the tone arm in a manner described below.

The unit of the transmission means of our invention which is formed with the elongated gap in the embodiment of FIGS. 6–9 takes the form of a rotary transmission member 74 having the pair of motion-transmitting portions 103 and 104 which extend through complete circles in this embodiment and which define between themselves the gap through which extends the axis of the other of the transmission units of the transmission means of our invention. This unit 74 is turnably carried by a bell crank 75 which is supported for swinging movement about a stationary pivot 76 carried by the plate 3 of the support means. The cable 71 is received in the grooves of a grooved pulley portion 77 which forms a grooved pulley integral with and coaxially fixed to the rotary transmission unit 74, as shown most clearly in FIG. 6.

The motion-transmitting portions 103 and 104 define between themselves the elongated circular gap 78 into which extends the stepped transmission unit having the circular stepped portions 79 and 100 which are adapted respectively to cooperate with the motion-transmitting portions 103 and 104. In this case also the transmission takes place by frictional engagement between the unit 79, 100 and the unit 74. The motor 27 drives a worm-and-worm-wheel drive so as to rotate the stepped unit 79, 100. For this purpose the motor 27 rotates a worm 102 which meshes with a worm-wheel 101 fixedly connected coaxially with the rotary unit, 79, 100, and the latter is in this way rotated by the motor about a fixed stationary axis of rotation. In the position of the parts illustrated in FIG. 7 the smaller motion-transmitting member 100 frictionally engages the inner motion-transmitting portion 104 so as to turn the latter in counterclockwise direction while the unit 79, 100 continuously turns in a clockwise direction, as shown by the arrow in FIG. 7. Of course, instead of a worm-and-worm-wheel drive, it is possible for the motor 27 to drive the units 79, 100 through friction wheels.

The rotary unit 74 is shifted between the two positions which will provide swinging movement of the tone arm 70 in opposed directions by turning of the lever 75 about the pivot 76, and during this turning movement the outer peripheral surface of the grooved pulley 77 remains substantially tangent to the plane which includes the pulleys 72 and 73. The lever 75 carries a pin 120 about which the unit 74 can turn, and the lever 75 can be turned in a counterclockwise direction about the pin 76 from the position shown in FIG. 7 in order to place the motion-transmitting portion 103 in engagement with the motion-transmitting member 79.

Figure 7:
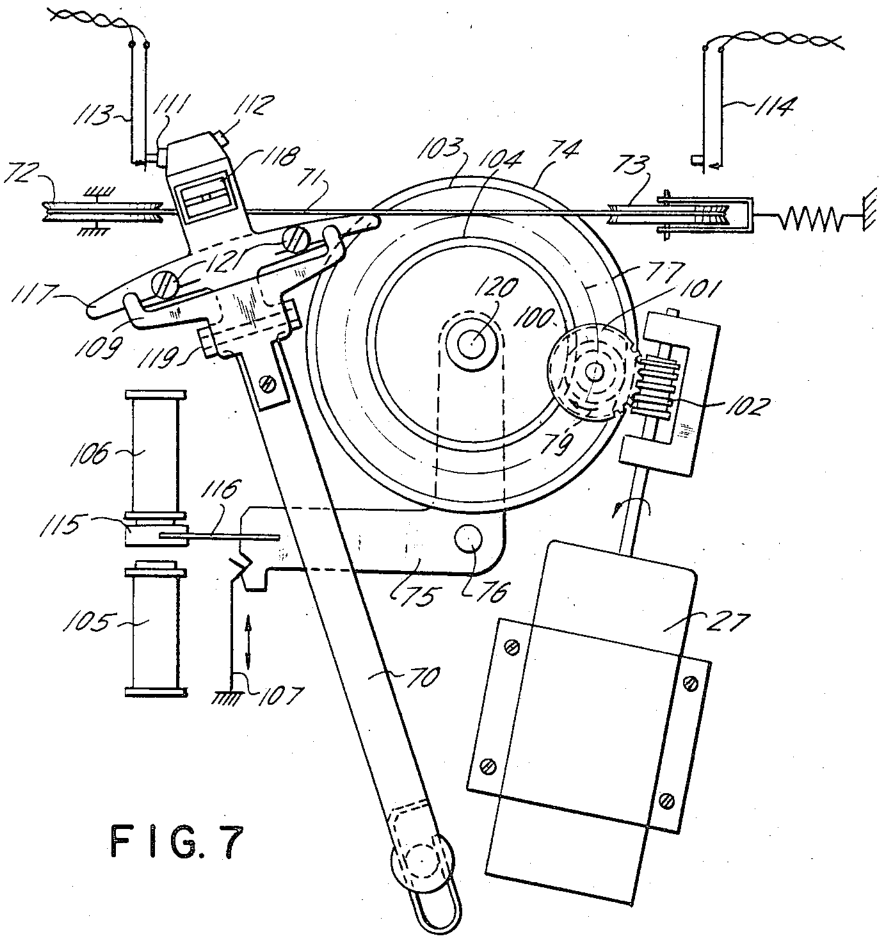
FIG. 7 is a schematic plan view of this third embodiment.

For the purpose of turning the lever 75, the displacing means of this embodiment of our invention includes a pair of electromagnetic coils 105 and 106 capable of being alternately energized. During turning of the transmission unit 74 in one direction the cable 71 is pulled in one direction to provide one direction of turning of the tone arm while in the other direction of turning of the transmission unit 74 the cable 71 is displaced in an opposite direction and will turn the tone arm 70 in the opposite direction. In the event that it is desired to interrupt the operations either during recording or playback, the current which flows through the coils 105 and 106 is interrupted in a known manner and at this time the lever 75 will be automatically situated in an intermediate neutral position by way of a leaf spring 107 cooperating with a notch of the lever 75, as shown in FIG. 7, so that in this way a detent structure is provided for automatically placing the apparatus in a neutral position where the unit 74 does not have any cooperation with the units 79, 100. Thus, with this arrangement the tone arm 70 will remain stationary while the motor 27 can continue to operate.

The cable 71 is turned through a few turns around the grooved pulley 77 in the grooves thereof, and from the latter the cable passes around the pair of pulleys 72 and 73. It is to be noted that the pulley 73 is urged by a spring away from the pulley 72 so as to maintain the cable 71 under suitable tension. From the pair of pulleys 72 and 73 the cable 71 has a pair of portions which extend toward each other, and these portions extend around a grooved roller section 117 which is symmetrically fixed to and projects laterally from the tone arm 70 in the region of its pick-up head 118. This grooved roller section 117 is also formed with a pair of grooves for receiving portions of the cable 71, and it has an outer grooved surface portion forming part of a cylinder whose axis coincides with the turning axis of the tone arm 70, this cylinder also being tangential to the plane in which the pulleys 72 and 73 are situated. Thus, the portions of the cable which extend toward each other from the pulleys 72 and 73 are extended into the grooves of the roller section 117 and the free ends of the cable are then fixed to the roller section 117 by the screws 121, as shown in FIG. 7. Thus, during turning of the unit 74 in one direction, the upper run of the cable 71 which passes around the pulleys 72 and 73 will have one portion winding onto and another portion simultaneously unwinding from the grooved pulley 77, while the lower run of the cable 71, as viewed in FIG. 8, will also have a pair of portions one of which is wound onto and the other of which is simultaneously unwound from the roller section 117, thus pulling the latter and swinging the arm 70 in one direction. In the other direction of rotation of the unit 74 of the transmission means of our invention the cable portions will be moved in the reverse direction with those portions which previously were unwound from the pulleys 77 and 117 being rewound thereon, and the portions previously wound onto these pulleys now being unwound therefrom, so that in this way the direction of swinging movement of the lever 70 is reversed.

Figure 8:
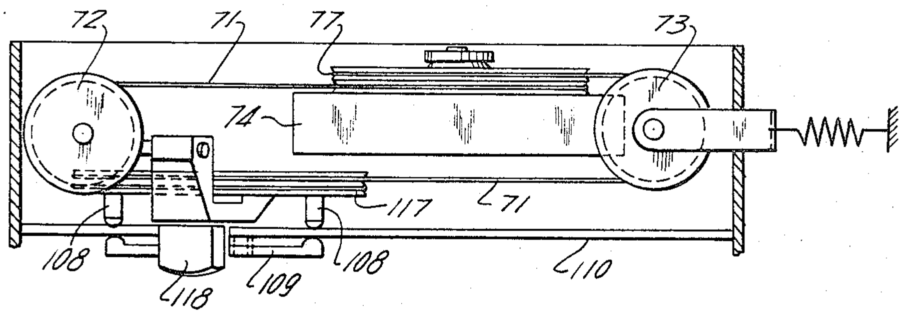
FIG. 8 is a partly sectional schematic end view of the structure of FIG. 7.

In this embodiment of our invention the tone arm 70 is guided by way of a pair of slide pins 108 which have free ends slidably engaging a slide plate 110 fixedly carried by the support means, in the manner shown most clearly in FIG. 8. The pins 108 are carried by the roller section 117. The tone arm 70 pivotally supports a slide lever 109 urged by a spring about an axis perpendicular to that of the tone arm 70 so that free ends of the lever 109 slidably engage the slide plate 110 at the side thereof which is opposed to and directed away from the slide pins 108. Thus, during swinging movement of the tone arm 70 the slide pins 108 slide along the plate 110 on one face thereof and the spring-pressed lever 109 slides along the plate 110 on the other side thereof and serves by its spring action to maintain the pins 108 in engagement with the plate 110. The spring force acting on the pulley 73 serves to maintain the tension in the cable 71 constant.

The reversal in the direction of movement of the tone arm is brought about by the switch-actuating elements 111 and 112 carried directly by the tone arm 70 and engaging the switches 113 and 114, respectively, at the ends of the swinging movement of the arm 70, as shown schematically in FIG. 7. These switches 113 and 114 are connected through an unillustrated circuit with the relay coils 105 and 106.

Figure 9:
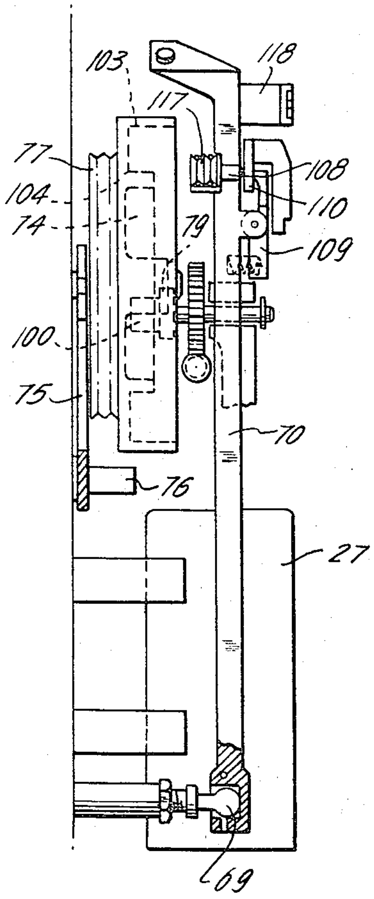
FIG. 9 is a schematic side view of the structure of FIGS. 6–8.

In order to adjust the attitude of the tone arm 70 so that it will always remain in a uniform position with respect to the signal-carrying sheet, in the form of a tape, for example, the pivot 69 has a spherical portion received in a recess of the arm 70, as shown most clearly in FIG. 9, thus permitting the arm 70 to rock about its pivotal connection with the pivot pin 69, and the slide pins 108 are longitudinally adjustable on the member 117, so that in this way a three-point adjustment capable of regulating the attitude of the tone arm 70 is provided. For this purpose it is to be noted that the pivot pin 69 is also longitudinally adjustable, so that in this way the position of the tone arm 70 can be very accurately regulated.

In order to start the apparatus of FIGS. 6–9 the main switch is closed so that the motor 27 runs and it will rotate in only one direction, as shown by the arrow in FIG. 7, during operation of the apparatus. The tone arm 70 is shown in FIG. 7 when it has reached its left end position, as viewed in FIG. 7. Thus, in this position of the parts the element 111 has closed the switch 113. The coil 106 is energized through the relay circuit and at the same time the circuit of the coil 105 is interrupted. In this way an armature 115 which is situated between these coils is attracted to the coil 106. This armature 115 is connected by a leaf spring 116 with the lever 75 so as to swing the latter in a clockwise direction about the pivot 76, thus placing the motion-transmitting portion 104 in frictional engagement with the motion-transmitting member 100. Therefore, in the manner described above the direction of swinging movement of the arm 70 is reversed, and the arm 70 now turns in a clockwise direction, with part of the cable 71 winding onto and part unwinding from the grooved pulley 77. Thus operation continues until the switch-actuating element 112 closes the switch 114. Now the coil 105 is energized, and the lever 75 is turned in a counterclockwise direction, as viewed in FIG. 7, about the pin 76, thus displacing the motion-transmitting portion 103 into frictional engagement with the motion-transmitting member 79. Now the direction of turning movement of the rotary transmitting unit 74 is reversed and the tone arm 70 is again swung to the left, as viewed in FIG. 7.

In the event that the recording or playback operations should be interrupted, the flow of current to the coils 105 and 106 is interrupted and the detent spring 107 will cooperate with the lever 75 to place it in its neutral intermediate position, as pointed out above. The concentric motion-transmitting portions 103 and 104 are now both out of engagement with the units 79, 100, and the tone arm 70 remains stationary, while the motor 27 continues to run.

This particular embodiment of our invention has the advantage of making it possible to adjust the attitude of the tone arm 70, particularly the position of its pick-up head 118.

We claim:

1. In a device for reproducing recorded sounds of the type wherein the recorded signals are arranged along arcs of a plurality of concentric circles and a tone arm swings back and forth through a predetermined angle so as to reproduce said recorded sounds during both directions of said swing, a swingable tone arm, support means supporting said arm for swinging movement back and forth through a predetermined angle, a driving motor rotating only in one direction and carried by said support means at a predetermined fixed located space from said tone arm, transmission means driven by said motor and operatively connected to said tone arm for transmitting a drive from said motor to said tone arm and for swinging said tone arm back and forth at the same angular speed in both directions of swinging movement, said transmission means having one position in which said tone arm swings in one direction and another position in which said tone arm swings in the opposite direction, displacing means operatively connected to said transmission means for displacing the latter between its positions when said tone arm reaches the ends of its swinging movement through said predetermined angle, and said transmission means comprises a first rotary transmission unit driven in only one direction of rotation by said motor and including a pair of coaxial circular motion transmitting members of different diameters which turn together and a second transmission unit having a pair of coaxial motion transmitting portions extending respectively along circles of different diameters and adapted respectively to engage said members of said first unit and said positions, respectively, of said transmission means, said motion transmitting portions of said second unit defining between themselves an elongated gap through which the axis of said first unit extends and said displacing means displacing one of said units between one position where the portion of said second unit which is of larger diameter engages the motion transmitting member of said first unit which is of larger diameter and another position where the portion of said second unit which is of smaller diameter engages the motion transmitting member of said first unit which is of smaller diameter, the ratios between the diameters of said members of said first unit respectively with respect to the diameters of said portions of said second unit being equal so that irrespective of the position into which said one unit is displaced by said displacing means said arm will swing at the same speed.

2. The combination of claim 1 and wherein said units of said transmission means cooperate frictionally for transmitting a drive therebetween.

3. The combination of claim 1 and wherein said support means includes a supporting plate with respect to which said arm is swingable in a plane parallel to said plate about an axis perpendicular thereto, said one unit of said transmission means including a control plate formed with said elongated gap defined between said motion transmitting portions of said second unit, said gap extending along an arc of a circle whose center is in the turning axis of said tone arm and said support means guiding said control plate for radial movement with respect to said turning axis of said tone arm back and forth between said positions of said transmission means, said portions of said second unit being respectively located at different elevations with respect to said plate of said support means and said motion transmitting members of said first unit respectively being located also at said different elevations with the member of said first unit of larger diameter located at the same elevation as the portion of said second unit of larger diameter and the member of said first unit of smaller diameter located at the same elevation as said portion of said second unit of smaller diameter, and displacing means including a pair of electromagnets which are alternately energized for displacing said transmission means between said positions, respectively, and said displacing means being operatively connected with said control plate for shifting the latter radially with respect to said turning axis of said tone arm to displace in one of said positions of said transmission means said portion of larger diameter of said second unit into engagement with said member of larger diameter of said first unit and in the other of said positions of said transmission means said portion of smaller diameter of said second unit into engagement with said member of smaller diameter of said first unit.

4. The combination of claim 3 and wherein said rotary first unit is carried by said tone arm and said transmission means including a belt-and-pulley drive from said motor to said rotary first unit.

5. The combination of claim 4 and wherein said belt-and-pulley drive includes a pair of coaxial rotary pulleys turnable about the turning axis of said tone arm, a pulley directly connected with said motor to be rotated thereby, a pair of guide pulleys, and a first endless cable extending around one of said pair of coaxial pulleys, guided by said guide pulleys, and extending around said pulley driven directly by said motor, and an additional pulley connected with said first rotary unit for rotation therewith, said belt-and-pulley drive including a second endless cable extending around the other of said pair of coaxial pulleys and the pulley which is connected to said first unit for rotation therewith.

6. The combination of claim 4 and wherein said belt-and-pulley drive includes a pair of pulleys respectively coaxial with the turning axis of said tone arm and the turning axis of said first rotary unit of said transmission means and an endless belt extending around said pulleys, and a friction drive extending between said driving motor and said pulley which is coaxial with said turning axis of said tone arm, said friction drive including a rotary friction disc driven by said motor and operatively connected to said pulley which is coaxial with said turning axis of said tone arm for rotating the latter pulley.

7. The combination of claim 1 and wherein said tone arm is elongated and has a pair of opposed ends between which said second unit of said transmission means is located, said second unit being carried by said tone arm for swinging movement therewith and being symmetrically arranged with respect to said tone arm, and said second unit having the configuration of an arcuate plate, said latter plate being formed with said elongated gap and said gap extending along part of a circle whose center is in the turning axis of said tone arm, said support means including a support plate and said tone arm swinging in a plane parallel to said support plate, said turning axis of said tone arm being perpendicular to said support plate and said arcuate plate of said second unit also being situated in a plane parallel to said plate of said support means.

8. The combination of claim 7 and wherein said tone arm has a portion extending from said second unit away from the turning axis of said tone arm and terminating in a pick-up head of said tone arm, and a leaf spring fixed to and interconnecting said latter portion of said tone arm with said arcuate plate of said second unit of said transmission means.

9. The combination of claim 7 and wherein said transmission means includes a lever supported by said support means for turning movement about an axis parallel to the turning axis of said tone arm, and a rotary pin carried by said lever for free rotation and having an axis coinciding with the axis of said first rotary unit of said transmission means, said first rotary unit being fixed to said pin for rotation therewith and said transmission means including a friction disc also fixedly carried by said pin, said disc being driven from said motor and said displacing means being operatively connected to said lever for turning the latter to place said first unit into engagement with said second unit of said transmission means.

10. The combination of claim 9 and wherein said displacing means includes a relay having a swingable armature coacting with said lever for turning the latter to displace said transmission means between said positions thereof.

11. The combination of claim 9 and wherein a second lever is supported by said support means for turning movement about the turning axis of said first-mentioned lever, and said transmission means including said second lever and a stepped friction wheel supported for rotary movement by said second lever and having one step frictionally engaging said friction disc and another step driven from said motor, and said transmission means further including a spring operatively connected with said levers for urging them to turn toward each other so as to maintain the frictional engagement between said stepped wheel and said friction disc.

12. The combination of claim 9 and wherein said displacing means includes a spring coacting with said lever for urging one of said members of said first unit into engagement with one of said portions of said second unit, said displacing means displacing the other of said members of said first unit into engagement with the other of said portions of said second unit in opposition to said spring to displace said transmission means between said positions thereof.

13. The combination of claim 12 and wherein an adjusting means is operatively connected with said spring for adjusting the force with which the latter acts on said lever.

14. The combination of claim 11 and wherein said transmission means includes a rotary friction member directly driven by said motor and engaging said stepped friction wheel to rotate the latter.

15. The combination of claim 1 and wherein said second unit is of circular configuration and said gap thereof also is of a circular configuration, said second unit of said transmission means turning about an axis passing through its center and said transmission means including a grooved circular pulley coaxially fixed to said second unit, a pair of additional pulleys respectively having parallel axes perpendicular to the axis of rotation of said second unit, and a grooved roller section fixed to said tone arm and having a grooved surface portion extending along part of a cylinder whose axis coincides with the turning axis of said tone arm, said cylinder extending tangentially with respect to a plane perpendicular to the parallel axes of said pair of additional pulleys and in which said additional pulleys are located, and said transmission means including a cable wound around said grooved pulley which is fixed to said second unit, extending therefrom in opposite directions around said pair of additional pulleys, said grooved pulley which is fixed to said second unit also having an outer surface tangential with said plane and said cable having portions situated in said plane and extending from said pair of additional pulleys toward each other to said roller section and into the grooves thereof, and said cable having portions fixed with respect to said roller section, so that during rotation of said second unit of said transmission means in one direction the portions of said cable which extend from said pair of additional pulleys toward each other will respectively wind onto and off from said roller section while displacing the latter and said tone arm therewith in one direction about the turning axis of said tone arm, and during rotation of said second unit in an opposite direction the tangential movement of said portions of said cable extending toward each other from said pair of additional pulleys onto and from said roller section will be reversed while said tone arm swings in an opposite direction.

16. The combination of claim 15 and wherein a slide plate is carried by said support means in a plane perpendicular to the turning axis of said tone arm, and said roller section carrying a pair of slide pins respectively having free ends slidably engaging said slide plate to slide therealong for guiding said tone arm during its swinging movement.

17. The combination of claim 16 and wherein said pins are axially adjustable and said support means includes a pivot pin for said tone arm determining the turning axis thereof and having a spherical portion about which said tone arm is rockable, so that by adjusting said pins the attitude of said tone arm can be adjusted.

18. The combination of claim 16 and wherein a slide lever is turnably carried by said tone arm for movement about an axis perpendicular to the axis of turning of said tone arm, said slide lever overlapping said slide plate at a side thereof opposed to and directed away from said pins and a spring carried by said tone arm and engaging said lever to urge the latter into sliding engagement with said plate for maintaining said pins in engagement with said slide plate.

19. The combination of claim 15 and wherein said first rotary unit has a stationary axis of rotation and is driven by said motor, the turning axis of said first unit extending through the circular gap defined between the circular portions of said second unit and said displacing means being operatively connected with said second unit for displacing the latter to determine said positions of said transmission means, said grooved pulley which is fixed to said second unit remaining substantially tangential with said plane in which said pair of additional pulleys are located during movement of said second unit by said displacing means.

20. The combination of claim 19 and wherein said transmission means includes a worm-and-worm-wheel drive between said motor and first unit for transmitting a drive from said motor to said first unit.

21. The combination of claim 15 and wherein said second unit together with said grooved pulley fixed thereto are supported for rotation by a pin extending along the turning axis of said second unit, said displacing means including a lever carrying said pin and supported for turning movement by said support means about an axis parallel to the turning axis of said tone arm, and said displacing means including a relay armature operatively connected with said lever and a pair of relay coils respectively situated on opposite sides of said armature for alternating turning the latter in one direction or the other, together with said lever, during alternate energizing of said relay coils, so as to displace said second unit for determining said positions of said transmission means.

22. The combination of claim 21 and wherein a yieldable detent means is operatively connected with said lever for placing the latter, when neither of said relay coils are energized, in an intermediate position where both of said portions of said second unit are simultaneously out of engagement with both of said members of said first unit.

References Cited

UNITED STATES PATENTS 2,964,324 12/1960 Brasseur.

FOREIGN PATENTS 157,806 11/1963 Germany.

LEONARD FORMAN, *Primary Examiner.*

ROGER A. FIELDS, *Assistant Examiner.*